J. H. BELL.
TELEGRAPH SYSTEM.
APPLICATION FILED DEC. 28, 1918.
1,359,952.  Patented Nov. 23, 1920.
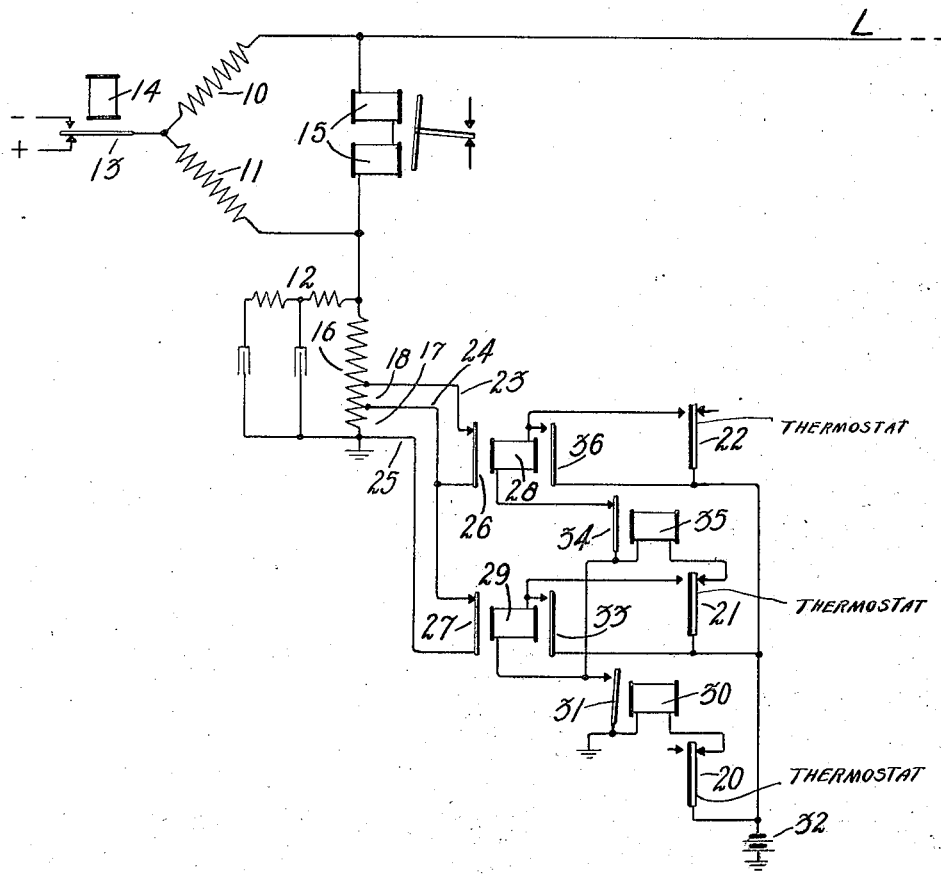
Inventor:
John H. Bell
by J.E.Roberts
Atty.

UNITED STATES PATENT OFFICE.

JOHN H. BELL, OF SOUTH ORANGE, NEW JERSEY, ASSIGNOR TO WESTERN ELECTRIC COMPANY, INCORPORATED, OF NEW YORK, N. Y., A CORPORATION OF NEW YORK.

TELEGRAPH SYSTEM.

1,359,952.   Specification of Letters Patent.   Patented Nov. 23, 1920.

Application filed December 28, 1918. Serial No. 268,622.

*To all whom it may concern:*

Be it known that I, JOHN H. BELL, a citizen of the United States, residing at South Orange, in the county of Essex, State of New Jersey, have invented certain new and useful Improvements in Telegraph Systems, of which the following is a full, clear, concise, and exact description.

This invention relates to telegraph systems and particularly to improved means for controlling the balance of duplex, quadruplex, and other telegraph circuits.

With overhead cable telegraph circuits, most of the electrical constants, such as insulation, resistance, capacity, etc., are more or less stable, but owing to the circuits being exposed to temperature changes, the ohmic resistance of the wires varies considerably. It is the principal object of this invention to provide means for automatically changing the resistance of the artificial line of a duplex or quadruplex system to compensate for resistance variations in the line wires.

More specifically the invention contemplates the employment of a plurality of thermostats responsive to the different temperatures, associated with a plurality of relays for automatically increasing the resistance of the artificial line in proportion to corresponding increases of resistance in the line wire, and vice versa.

The invention will be readily understood by reference to the accompanying drawing which illustrates schematically the preferred form of applicant's invention.

In the drawing, L represents a telegraphic line conductor terminating in a duplex network comprising two ratio arms 10 and 11 and an artificial line 12. The apex of the network is connected to an armature 13 of a transmitter magnet 14, which armature is adapted to connect either positive or negative battery to the line, depending upon whether the magnet 14 is energized or deënergized. In place of the transmitting magnet and armature, of course, may be substituted an ordinary telegraph key or any suitable form of transmitter device. Bridged across the ratio arms 10 and 11 is the usual receiving device 15.

The resistance 16 of the artificial line 12 may be divided into a plurality of sections 17, 18, etc., as illustrated, one or more sections of which may be automatically rendered effective or ineffective to compensate for changes in line resistance as will now be described.

For purposes of illustration, let it be assumed that the temperature is such that all of the thermostats 20, 21 and 22, etc., are in engagement with their right-hand contacts—say, for example, a temperature less than 60° Fahrenheit. Then the resistance sections 17 and 18 of the artificial line will be shunted by conductors 23, 24 and 25 and armatures 26 and 27 of relays 28 and 29 respectively. Let it be further assumed that thermostat 20 responds to a temperature of approximately 60° Fahrenheit and in so doing, moves out of engagement with its right-hand contact and into engagement with its left-hand contact. Let it also be assumed that thermostat 21 responds in a like manner to a temperature of approximately 75° Fahrenheit and that thermostat 22 responds in a like manner to a temperature of approximately 90° Fahrenheit. Then when the temperature reaches approximately 60°, thermostat 20 will move away from its right-hand contact and into engagement with its left-hand contact. This will result in the energizing circuit of relay 30 being broken, thereby permitting armature 31 to fall back into engagement with its back contact. The actuation of thermostat 20 and the consequent deënergization of relay 30, at this time does not alter in any way the electrical condition of the artificial line. When the temperature, however, increases to approximately 75°, thermostat 21 will move out of engagement with its right-hand contact and into engagement with its left-hand contact thereby completing an energizing circuit for relay 29 from grounded battery 32, thermostat 21, left-hand contact thereof, winding of relay 29 and armature 31 of relay 30 to ground. Relay 29 will thereupon attract its armatures 27 and 33. The attraction of armature 27 removes the shunt around resistance 17, thereby placing the resistance effectively in series with the artificial line. The attraction of armature 33 establishes a holding circuit for relay 29 from grounded battery 32, armature 33 and front contact thereof, winding of relay 29 and armature 31 to ground. This holding circuit will be maintained independently of thermostat 21 and until relay 30 is energized. Should the temperature increase still further—say to 90°, thermostat 22 will move away from its right-hand contact and into engagement with its left-hand contact thereby completing an energizing circuit for relay 28, which may be traced from grounded battery 32, thermostat 22 and left-hand contact thereof, winding of relay 28, armature 34 of relay 35 and armature 31 of relay 30 to ground. Relay 28 will thereupon attract its armature 26 and 36, the attraction of the former removing the shunt around resistance section 18 thereby placing the resistance effectively in series with the artificial line and the attraction of the latter establishing a holding circuit for relay 28 from grounded battery 32, armature 36 and contact thereof, winding of relay 28, armature 34 of relay 35 and armature 31 of relay 30 to ground. It is obvious that, if desirable, additional thermostats and relays may be provided and arranged in a like manner to compensate for further increases in line resistance due to higher temperatures.

Now if the temperature recedes or falls below 90° thermostat 22 will move away from its left-hand contact and into engagement with the right-hand contact. This actuation of thermostat 22 however will not in any way alter the electrical condition of the artificial line because relay 28 has been locked up over a circuit independent of thermostat 22. Should the temperature however fall to 60° or an amount required to cause thermostat 21 to move from its left-hand contact into engagement with its right-hand contact, an energizing circuit will thereupon be established for relay 35 from grounded battery 32, thermostat 21 and right-hand contact thereof, winding of relay 35 to armature 31 and ground. Relay 35 upon being energized attracts its armature 34 thereby opening the holding circuit of relay 28 and permitting its armatures 26 and 36 to return to their normal positions. Armature 26 when in its normal position, as illustrated, effectively shunts the resistance 18. Should the temperature decrease still further or an amount sufficient to cause thermostat 20 to move from its left-hand contact into engagement with its right-hand contact, an energizing circuit will again be established through relay 30. Relay 30 in attracting its armature 31 opens the holding circuit of relay 29, and permits its armature 27 to return to normal position and effectively shunt the resistance 17 of the artificial line.

Obviously the thermostats may be constructed and the contacts thereof so adjusted that smaller variations in temperature, for example 5° or 10° variation may be readily compensated for. It will further be understood that any number of thermostats and relays may be employed to cover any range of temperature changes.

What is claimed is:

1. The method of automatically maintaining a telegraph circuit balanced, which consists in providing an artificial line with resistance therein, and associating therewith means for automatically altering the resistance of the artificial line to compensate for changes in line resistance due to temperature changes.

2. A telegraph circuit consisting of a main line and an artificial line, a plurality of normally ineffective resistance sections in the artificial line, and variably responsive means associated therewith for rendering said resistance sections progressively effective.

3. A telegraph circuit comprising a main line and an artificial line, said artificial line including a plurality of resistance units, a circuit normally shunting one of said resistance units, and heat responsive means associated therewith for automatically opening said shunt circuit.

4. A telegraph circuit comprising a main line and an artificial line, said artificial line including a plurality of resistance units, a circuit normally shunting one of said resistance units, and means responsive to temperature changes associated therewith for automatically opening said shunt circuit.

5. A telegraph circuit comprising a main line and an artificial line, resistance sections included in said artificial line, circuits normally shunting said resistance sections, and electro-responsive devices associated therewith for opening said shunt circuit sequentially.

6. A telegraph circuit comprising a main line and an artificial line, said artificial line including resistance divided into sections, circuits normally shunting said resistance sections, relays for controlling said circuits, and means associated therewith for automatically opening said shunt circuits in predetermined sequential order through the instrumentality of said relays.

7. A telegraph circuit comprising a main line and an artificial line, said artificial line including resistance divided into sections, circuits normally shunting said resistance sections, relays for controlling said circuits, and a plurality of thermostats for controlling said relays.

8. A telegraph circuit comprising a main line and an artificial line, said artificial line being normally balanced against said main line, means for varying the resistance of the artificial line, and a plurality of thermostats responsive to different temperatures for automatically controlling the operation of said means.

In witness whereof I hereunto subscribe my name this 27th day of December, A. D. 1918.

JOHN H. BELL.